United States Patent [19]

Heier et al.

[11] Patent Number: 5,251,156
[45] Date of Patent: Oct. 5, 1993

[54] METHOD AND APPARATUS FOR NON-CONTACT MEASUREMENT OF OBJECT SURFACES

[75] Inventors: Helmut Heier; Klaus-Peter Koch, both of Aalen; Karl-Hermann Breyer, Heidenheim, all of Fed. Rep. of Germany

[73] Assignee: Carl-Zeiss-Stiftung, Heidenheim/Brenz, Oberkochen, Fed. Rep. of Germany

[21] Appl. No.: 728,557

[22] Filed: Jul. 11, 1991

Related U.S. Application Data

[63] Continuation-in-part of Ser. No. 616,627, Nov. 21, 1990.

[30] Foreign Application Priority Data

Aug. 25, 1990 [DE]  Fed. Rep. of Germany ....... 4026942

[51] Int. Cl.$^5$ ............................................. G01B 11/24
[52] U.S. Cl. .................................... 364/559; 356/376; 356/426; 33/503; 33/559; 364/560; 358/98; 358/107
[58] Field of Search ............... 364/559, 525, 560, 713, 364/474.37, 478, 507, 474.05; 358/107, 108, 106, 109, 88; 33/503–504; 356/1, 375, 376, 426; 367/907; 340/712

[56] References Cited

U.S. PATENT DOCUMENTS

| | | | |
|---|---|---|---|
| 4,884,889 | 12/1989 | Beckwith, Jr. | 356/375 |
| 4,888,877 | 12/1989 | Enderle et al. | 33/559 |
| 4,908,951 | 3/1990 | Gurny | 358/107 |
| 4,953,306 | 9/1990 | Weckenmann et al. | 33/552 |
| 4,993,836 | 2/1991 | Furuhashi et al. | 358/107 |

FOREIGN PATENT DOCUMENTS 0197341 11/1986 European Pat. Off.
9210308 4/1985 Japan.
2-243914 12/1990 Japan.

Primary Examiner—Thomas G. Black
Assistant Examiner—Julie D. Day
Attorney, Agent, or Firm—Hopgood, Calimafde, Kalil, Blaustein & Judlowe

[57] ABSTRACT

Pictures of an object to be measured are taken from several different positions or aspects by a video camera which is mounted via a two-axis articulating head to the measurement arm of a coordinate-measuring machine. The pictures taken from the different positions or aspects are stored and are evaluated with respect to the coordinates of characteristic points of interest on the surface of the object by the method of space intersection, known from photogrammetry. And, in this connection, the position-measurement values supplied by the scales of the coordinate-measuring machine and the angle-measurement values supplied by the articulating head are used for a calculated determination of the coordinates for each of the points of interest on the surface of the object.

14 Claims, 2 Drawing Sheets

METHOD AND APPARATUS FOR NON-CONTACT MEASUREMENT OF OBJECT SURFACES

RELATED CASE

This application is a continuation-in-part of copending application Ser. No. 07/616,627, filed Nov, 21, 1990. The disclosure of said copending application is hereby incorporated by reference.

BACKGROUND OF THE INVENTION

Coordinate-measuring machines (CMM) of various construction are known for the tactile measurement of objects. All of these machines have a measurement arm which can be positioned in three directions in space, and the end of the measurement arm carries a probe head with a probe which mechanically contacts the object or workpiece to be measured.

These machines are poorly suited for uses in which very large workpieces must be measured or in which a great density of points is required, since for each measurement point the probe must be moved into contact with the workpiece, resulting in relatively long measurement times.

It has, therefore, also already been proposed to measure such objects optically by three-dimensional triangulating intersection from at least two points, as for example, by means of two theodolites.

However, no significant reduction in measurement time can be obtained with simple manually operated optical systems of this kind, since each measurement point must also be targeted directly by the operator, using both optical sighting devices.

It has, therefore, already been proposed to motorize the axes of the theodolites and to include electronic sensors in the form of CCD cameras in the ray path of the observation telescope of each theodolite; the CCD cameras produce images which are then automatically evaluated in an associated image-processing unit. One such measurement system is described in VDI Berichten No. 711, 1988, pages 139-151.

However, the known system is very cumbersome and expensive since it contains a large number of components that are unnecessary in a system for measuring industrial objects, since the theodolites used are special instruments for geodesy and contain, for example, compensators, leveling devices, mechanical coarse/fine drives for angle-setting, and multiply scanned angle circles; these are among a number of components which are necessary solely for manual operation or for geodetic uses, but they are not needed for measurements on industrial objects.

On the other hand, theodolites supply angular values which are usable only in a leveled state whereby to assure a vertical axis that is truly vertical. This, in its turn, greatly limits the usefulness of a theodolite system for the measurement of industrial objects.

Substantially greater precision of measurement is definitely required for industrial projects than in geodesy, since the dimensions of measured objects are to be determined with a precision of a few $\mu m$. The need for precision requires that, if possible, the relation in space between sensors used for measurement and the object itself being measured, shall not change during a measurement cycle and that this relation be retained in stable manner. With theodolites that are simply tripod-mounted alongside the object to be measured, this requirement can be satisfied only with great difficulty since the positional relationships between object and sensor change as a result of vibrations, temperature influences, etc.

EPO patent application A1-0 256 968 describes a method for non-contact measurement of large objects, using two video cameras which are mounted for selective rotation on each of two orthogonal axes. To determine coordinate values, the signals of these cameras are fed to a computer, along with orientation-angle data from transmitters associated with the respective axes of rotation. Aside from the fact that this EPO patent application does not disclose the construction of the two-axis rotary device, this EPO case does not have anything to say regarding the problem of fixing the positional relation between the measurement object and the sensor.

Finally, U.S. Pat. No. 4,226,536 describes a non-contact optically-operated measurement system, illustratively for measuring the contour of helicopter-rotor blades, in which two mark projectors and two electro-optical trackers are mounted on a common frame which is movable on rails so that optical intersects can be produced over the entire length of the object and measured by the triangulation principle.

This system also operates relatively slowly since electro-optical tracking of the projected light spot which is moved over the surface of the object must be accurate. Constant positional relationships between the measurement system, on the one hand, and the object to be measured, on the other hand, depend on the quality of the bearings and guides used for the displaceable frame and cannot be definitely maintained within the above-indicated measurement-precision range of a few $\mu m$.

Furthermore, at least two picture sensors are always required in all the known measurement devices.

BRIEF STATEMENT OF THE INVENTION

The object of the present invention is to provide a method and apparatus for non-contact measurement of surfaces of objects involved in industrial production, such that by using a few substantially standardized measurement components, a large number of measurement points can be measured simultaneously, rapidly and with high precision.

The invention achieves this object by using a known commercial coordinate-measuring machine (CMM) wherein the conventional tactile probe thereof is replaced by a video camera and wherein the probe head which supports and orients the video camera is of the variety having two orthogonally related axes of rotary displacement. This probe head is mounted to the measurement arm of the CMM, which arm, in the case of a CMM having x, y, z displaceability, is the vertical or z-axis displacement system; in such case, said rotary axes are perpendicular to the z-axis system of the CMM. The invention involves addition of only a few instrumentalities to the CMM, namely, (i) a storage unit to store video data for pictures taken in different positions of the measurement arm and orientations of its probe head, (ii) a picture-processing unit for effecting picture evaluation, and (iii) suitable software to enable the computer of the CMM to calculate object coordinates pursuant to the method of space intersection known from photogrammetry.

An object to be measured is placed on the coordinate-measuring instrument; therefore, in the various picture-taking positions and orientations of the video camera, the spatial association of the video camera with respect to the object is maintained with the precision specified for the CMM. Environmental influences, such as vibrations, thermal drifts, etc., are substantially excluded since the CMM as a rule has a vibration dampened machine table and can be effectively isolated from such disturbing influences. Furthermore, only a single video camera is required for a measuring of the object. This has several advantages. Aside from the elimination of the second video camera which would otherwise be necessary, only calibration data for this one video camera need be obtained, stored and taken into account in the evaluation process.

In a coordinate-measuring machine which is constructed in accordance with the invention, it is advisable that the camera, together with an optical-projection unit, be mounted to the measurement arm of the CMM, via a unitary head or joint that can provide two-axis articulation of the camera and projection unit. It is then possible to mark measurement points in targeted fashion when the shape of extensive surfaces is to be measured. The camera and the projection unit then advisedly form a common structural unit which can be removably and reproducibly chucked, manually or automatically, to the articulation head.

DETAILED DESCRIPTION

Figure 1:
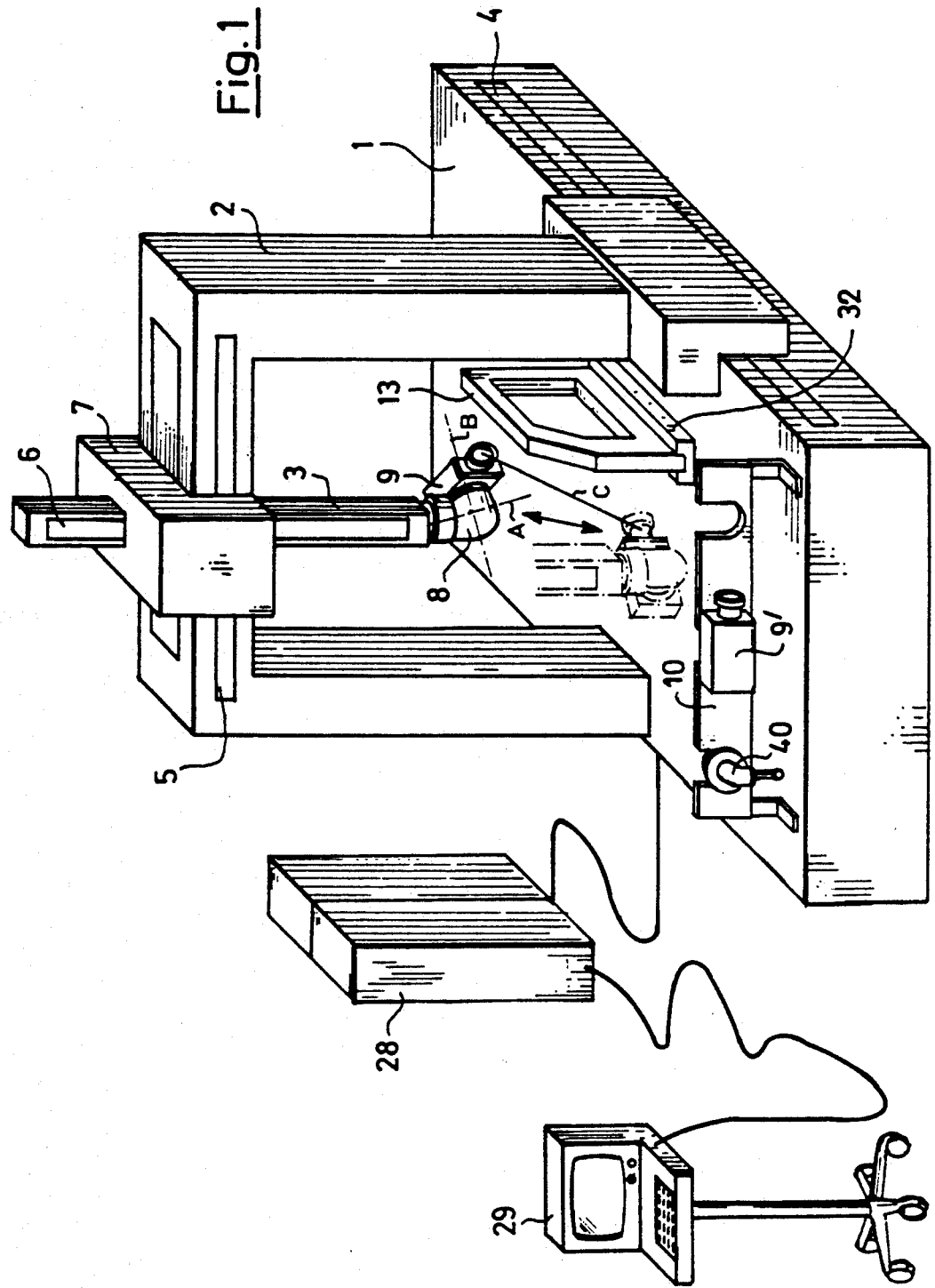
Figure 2:
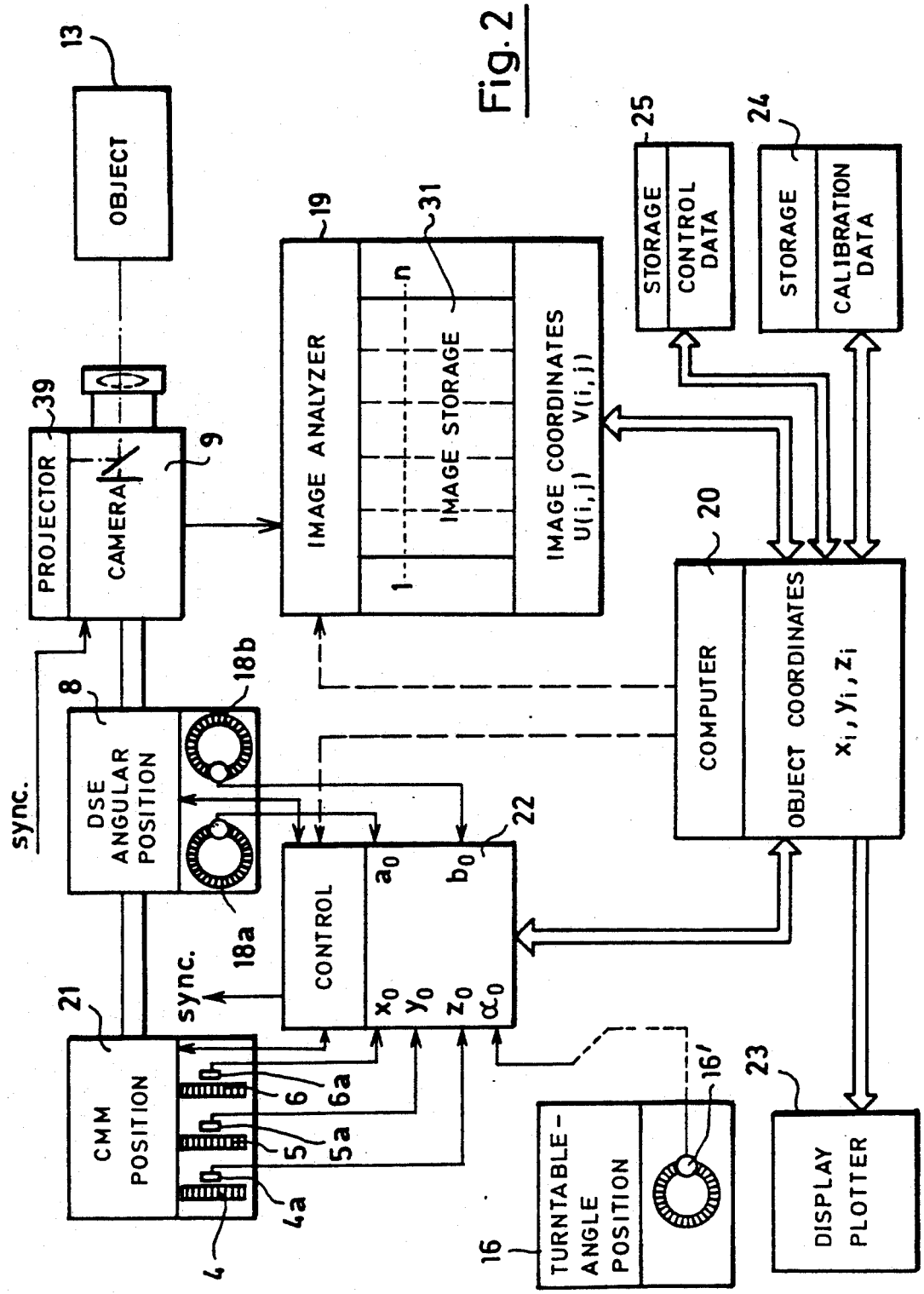

A preferred embodiment of the invention will be described in detail, in conjunction with the accompanying drawings. In said drawings:

FIG. 1 is a perspective view of a non-contact coordinate-measuring machine in accordance with the invention; and FIG. 2 is a block diagram to show interconnected components of the coordinate-measuring machine of FIG. 1.

The coordinate-measuring machine of FIG. 1 is illustratively of portal construction, having a stable table 1 of granite, which rests on four vibration dampers 1', for insulation from environmental conditions. A workpiece 13 to be measured is placed by means of a mount 32 on table 1.

The construction of such a coordinate-measuring machine is known and therefore need not be described in detail here. Portal structure 2 of the machine is movable in the y-direction; a transverse carriage 7 is movable thereon in the x-direction, and a measurement arm or spindle 3 is carried by and is displaceable vertically (in the z-direction) in the transverse carriage 7. A two-axis articulating head 8 is provided at the lower end of the measurement arm, and separate scales 4, 5 and 6 are seen in FIG. 1 for measuring the respective positional coordinates y, x and z of the articulating head 8.

The articulating head 8 is motor-driven for independent rotary displacement about two orthogonally related rotary axes (A, B) and is provided with separate angle-position transmitters for each of the respective rotary axes A, B, and reference is made to U.S. Pat. No. 4,888,877 for detailed description of a suitable articulating head, wherein the angle-position transmitters of the head have an angular resolution of 0.5 seconds. It will be understood that greater resolution can be obtained, using more finely divided angle-position transmitters, or by using refined interpolation of incrementally graduated annular scales (dials).

A video camera 9 is removably and reproducibly chucked to the articulation head 8 via a reproducible mount, not shown in detail here. The camera 9 therefore assumes the place which is otherwise assumed by tactile-measurement tooling that is customarily replaceably mounted to the articulation head.

For automated replacement of tactile-measurement tooling by the video camera, and vice versa, a magazine 10 is provided at the end of the measurement region of the CMM. The magazine 10 can accommodate a plurality of tactile probes 40 having different extensions, as well as a plurality of cameras 9' having different optical systems.

A cabinet 28 contains controls for motor-driven orientation about the respective axes of articulation head 8, and thus of the camera 9 mounted thereto, as well as for processing measured values of the measurement scales 4, 5, 6, and of the angle-position transmitters associated with head 8. This cabinet 28 also contains the electronic system for operating the video camera 9 and storage means for storing the camera pictures, as well as picture-processing electronics. An input keyboard 29 for operating the CMM is flexibly connected to the control cabinet 28.

The optical axis of video camera 9 can therefore, by means of the controllably articulated head 8, be directed at the object 13, from different positions of the measurement arm 3, to permit a complete contactless measurement, as will be described below. Each measurement requires camera orientation in at least two different positions from which different pictures of the same point or region object 13 can be taken. These two positions are indicated in FIG. 1, and their distance apart is designated by a straight line C.

Advisedly, a so-called areal CCD array is the photo-sensitive-surface sensor, at the focus of camera 9; such an array can have a surface area that is less than 60 mm$^2$. Such sensors typically have about 500×500 picture elements, and it is known that the resolution established by such an array of picture elements can be increased by subpixel algorithms, to a fraction of the pixel spacing. But such resolution, which is limited by the number of picture elements, is not sufficient for a highly accurate measurement of industrial objects. It is therefore necessary to photograph the object in several incrementally indexed and stored partial video pictures, and to determine the position in space of the partial pictures, within a common coordinate system in which the angle-position values supplied by the articulation head 8 are calculated along with data supplied by the camera concerning the picture position of the measurement point of interest. For example, if the video camera 9 has a picture field of 2°×2°, it is merely necessary for the articulation head 8 to orient its camera 9 so as to target the direct region of interest within roughly 1° and then, while motionless, to report the exact angle value to the computer of the CMM. No precise resetting of the actual roughly positioned direction to the desired direction is necessary.

In the measurement of each picture element, a three-dimensional beam is involved. The beam is defined by the center of projection of the lens of camera 9 and by the picture coordinates $x_m$, $y_m$, $z_m$, wherein $z_m$ is the distance of the normal from the projection center of the lens to the plane of the picture sensor of camera 9.

For each measurement, both the position of the sensor in the picture space and the orientation of the picture space in the coordinate system of the CMM must be known. The camera orientation is measured via the respective angle encoders of the articulation head 8. And information as to the position of the sensor in the imaging space can be determined by calibration, or it may be extracted from the video camera itself, by providing a reseau, i.e., a measurement grid, in front of the sensor plane, a technique which is known per se.

The imaging conditions and the picture supplied by the sensor in the camera 9 must furthermore be stable and reproducible during a measurement. It is therefore advisable to work with fixed-focus cameras, several cameras having different foci (or several optical systems of different fixed focal length) being interchangeably available from magazine 10.

The course of measurement performed with the coordinate-measuring machine of FIG. 1 can best be described with reference to the block diagram of FIG. 2, wherein 22 designates the control means by which camera 9 is (a) positioned pursuant to computer commands in the three traversable measurement axes (x, y and z) and (b) is also so oriented pursuant to computer commands with respect to components (a, b) of its angular position, via angular displacement about the respective axes (A, B) of articulation means 8, that the same object field can be electronically viewed from two different positions of the camera 9.

As can be noted from FIG. 2, a projector 39 is integrated in camera 9 so that a target beam can be projected through the camera lens in order to mark one or more object points to be measured.

The video signals of the camera 9 mounted to the articulation head 8 are fed to a picture-processing electronic system 19 which has provision for picture storage (31). The storage capacity at 31 is sufficient to store a plurality of different pictures taken by the video camera, which pictures correspond to viewing at different angular orientations of the camera and to viewing at each of the two positions of the camera which are spaced apart by the distance C.

In order to assure that each picture supplied by the sensor is geometrically stable during a given measurement procedure, the camera is externally synchronized via the control means 22 of the CMM. The picture storage 31 has sufficient capacity for the storage of all pictures which are to be used for an evaluation and at least for two pictures which are taken from the two different positions of the measurement arm.

During a measurement cycle, therefore, the entire surface of the object is electronically viewed from the two positions of the camera, and at different angular orientations of the camera, and the pictures taken are stored in the picture-storage means 31. Object details of interest which are present in pictures taken at both of the two positions of the camera, such as, for example, edges, marks, etc., are then identifiable within the picture-coordinate system of the sensor of the camera. In this connection, known methods of digital picture evaluation can be used, such as, for example, threshold-value, gradient or correlation methods. Evaluated picture data supplied by the picture-processing means 19 are transmitted to the computer 20 of the CMM. These picture data have picture coordinates U(ij), V(ij), wherein the subscript i characterizes different points of object interest, and wherein the subscript j identifies the viewing positions at which the different pictures are taken.

At the same time, the CMM computer 20 receives from control means 22 the angle-measurement values (a, b) which correspond to the orientation of the camera at the time of taking each picture. These angle-measurement values (a, b), together with the position of the center of projection of the camera lens, which is determined essentially by the measurement values (xo, yo, zo) of the linear scales (4, 5 and 6) of the CMM, give the orientation of the picture-coordinate system in the common coordinate system of the entire machine. And, using algorithms of space intersection known from photogrammetry, the computer is able to calculate the object coordinates (xi, yi, zi) unambiguously (a) from scale-read position-measurement values (xoj, yoj, zoj), (b) from scale-read angle-measurement values (aj, bj), and (c) from the picture data (Uij, Vij) delivered by the picture-processing means.

Suitable evaluation algorithms are described, for example, in the textbook "Photogrammetrie", by Konecny and Lehmann, Berlin; NY 1984, at Chapter 4, entitled: "Point-Wise Processing of Picture Data".

For an unequivocal evaluation, three measurement values are needed for each measurement point of interest on the object 13 to be measured. And it is noted that the two pictures obtained from two positions of the measurement arm already give four measurement values (in each case, two picture coordinates Uij, Vij). By this overdetermination, the result of the calculation can be checked.

The exact installed position of the articulation head 8 on the measurement arm of the CMM, as well as the installed position of the camera on the articulation head 8, enter into the calculation. These calibration data are determined only once and are entered into the storage means 24 of the CMM computer 20. This storage means 24 also contains calibration data of the video camera 9; these data describe deviations in geometry of the sensor itself as well as any distortion of the lens of the video camera 9.

Another storage means 25 of computer 20 contains control data on the basis of which a program of CNC measurement is effected for the object 13 in question. In this connection, the CMM computer 20 also directs the positioning and the orientation of camera 9, using stored control data. From the control data for camera orientation and from additionally indicated desired coordinates for object points to be measured, desired coordinates for the picture points can be calculated. And digital picture evaluation can be effectively controlled by these desired coordinates for the picture points.

An output unit 23 is provided for outputting of object coordinates, calculated with due consideration of calibration data from storage means 24. The unit 23 may be a display screen or a printer, or both.

The measurement of a complete workpiece 13 can be carried out "in one breath", in the case of picture storages of correspondingly large dimension, in that all measurement points of interest are first of all digitally photographed, and corresponding individual pictures (1 to n) are stored. For storage purposes, instead of a large semi-conductor picture-storage device, use may also be made of a real-time mass-storage device, such as an erasable optical-storage disc. The calculating process required for evaluation of the pictures can then proceed while the next workpiece to be measured is already being placed on the CMM table 1. With limited picture-storage space or, in the case of large objects which must be broken down into a patch-quilt plurality of edge-lapped partial pictures, the calcualtion process for the evaluation can take place in parallel (i.e., concurrently with) or intermittently to (i.e., in interlace with) the actual measuring of the object.

To measure the object on all sides, the video camera 9 must be moved into several positions around the object by means of the measurement arm 3. In the case of large workpieces, it is, however, at times difficult to maintain the minimum spacing from the object which is necessary for sufficient sharpness of the picture. For this purpose, it is advisable to clamp the workpiece or object 13 on a rotary table (turntable 16) and to so position the workpiece by means of the rotary table (as also shown in FIG. 2 of said application Ser. No. 07/616,627) that it can be measured completely over its entire circumferenoe from only two orientations of camera 9. In an embodiment modified in this manner, the drive of the rotary table and its angle transmitter (16') are, in addition, to be connected to the control means 22 in the block diagram of FIG. 2 herein, being shown with a broken-line connection, to indicate the optional nature of this structure.

During the entire measurement process, the positional relationships between the object 13 to be measured and camera 9 are constant and are known with the precision and stability specified for the coordinate-measuring machine. It is therefore possible to measure entire objects in one measurement run without time-consuming intermediate calibrations. And significantly, it is sufficient, after attaching the camera, to calibrate the machine only once, for measuring objects of known geometry.

What is claimed is:

1. A method of using a camera and a coordinate-measuring machine for non-contact measurement of coordinates on object surfaces, wherein the coordinate-measuring machine has a movable measurement arm (3) and associated measurement scales (4, 5, 6) for measuring measurement-arm movement in three directions in space, and wherein articulating-head means (8) mounts a camera and is carried by said measurement arm (3), said articulating-head means (8) having (i) two orthogonally related axes of independent action for controlled roatary and pivotal angular orientation of the mounted camera, and (ii) associated angle-measurement means providing angle-measurement values (a, b) of the articulating-head means (8), said method comprising:
    moving the measurement arm (3) into two different positions that are spaced apart;
    using the articulating-head means (8) to target the object to be measured, by rotating or pivoting the camera, and using the camera to take object-targeted pictures at each of the two positions;
    storing and evaluating pictures taken by the camera in the two positions, the evaluating being with respect to the coordinates of characteristic points on the surface of the object, by known photogrammetric methods of evaluation; and
    calculating object coordinates $(x_i, y_i, z_i)$ from picture coordinates $(U_{ij}, V_{ij})$ of the camera, using position and angle measurement values $(x_{oj}, y_{oj}, z_{oj}; a_{oj}, b_{oj})$ obtained from the scales of the coordinating-measuring machine and angle-measurement values obtained from the articulating-head means (8).

2. A method according to claim 1, wherein for each of the positions of the measurement arm (3), several pictures are taken and digitally stored for different angles of rotation or pivoting (a, b) of the articulating-head means (8).

3. A method according to claim 1, wherein the camera is a video camera and the calculated object coordinates are corrected with calibration data which describe (a) the position of attachment of the articulating-head means (8) on the measurement arm (3) of the coordinate-measuring machine, and (b) the position of attachment of the video camera with respect to the articulating-head means.

4. A method according to claim 3, in which the calculated object coordinates are additionally corrected for deviation in geometry (distortion) of the video camera (9).

5. A method according to claim 1, wherein the object is targeted and measured from all sides by moving the measurement arm (3) into different positions.

6. A method of using a camera and a coordinate-measuring machine for non-contact measurement of coordinates on object surfaces, wherein the coordinate-measuring machine has a movable measurement arm (3) and associated measurement scales (4, 5, 6) for measuring measurement-arm movement in three directions in space, and wherein articulating-head means (8) mounts a camera and is carried by said measurement arm (3), said articulating-head means (8) having (i) two orthogonally related axes of independent action for controlled rotary and pivotal angular orientation of the mounted camera, and (ii) associated angle-measurement means providing angle-measurement values (a, b) of the articulating-head means (8), said method comprising:
    mounting an object to be measured for rotation at offset from the camera, for camera viewing of the object from each of a plurality of different viewing aspects;
    for at least two different aspects of object viewing, pictures taken by the camrea are stored and evaluated with respect to coordinate points on the surface of the object, by known photogrammetric methods of evaluation; and
    calculating object coordinates $(x_i, y_i, z_i)$ from picture coordinates $(U_{ij}, V_{ij})$ of the camera, using position and angle measurement values $(x_{oj}, y_{oj}, z_{oj}; a_{oj}, b_{oj})$ obtained from the scales of the coordinate-measuring machine and angle-measurment values obtained from the articulating-head means (8) and measurement of the rotated angular position of the object.

7. A coordinate-measuring machine for non-contact measurement of surfaces of objects, said machine having
    a camera (9) which is mounted via an articulating head (8) having two orthogonally related axes of independent motor-driven angular displacement with built-in angle transmitters (a, b) for the rotary and pivoting movement of the camera on a measurement arm (3) of a coordinate-measuring machine, which arm is movable in three directions in space;
    means (19, 20) for calculating object coordinates from the position coordinates $(x_{oj}, y_{oj}, z_{oj})$ of the measurement arm and from the angular position $(a_{oj}, b_{oj})$ of the camera, as well as from the video signal of the camera (9), said means comprising:
    a picture-storage device (31) into which several pictures of the same region of the object can be read;
    picture-processing means (19) which, from the stored picture data of concordant object points, calculates their picture coordinates $(U_{ij}, V_{ij})$,
    an evaluation computer (20) which, from the picture coordinates $(U_{ij}, V_{ij})$ of the object points and from the position-measurement values $(x_{oj}, y_{oj}, z_{oj})$ of the scales (6) of the coordinate-measuring machine, as well as from the angle-measurement values (aoj, boj) of the articulating head (8), calculates the object coordinates (xi, yi, zi) of the picture points by the method of spaced intersection; and a storage device for storage of calibration data of the articulating head (8) and of the camera (9).

8. A coordinate-measuring machine according to claim 7, characterized by the fact that the camera (9) is mounted, together with an optical projection unit (39), on the articulating head means (8) of the coordinate-measuring machine.

9. A coordinate-measuring machine according to claim 7, characterized by the fact that the camera (9) and the projection unit (39) form a common structural unit which can be automatically placed on a reproducible mounting on the articulating head (8).

10. A coordinate-measuring machine according to claim 9, characterized by the fact that the machine includes a magazine (10) for storage of one or more structural units (9') and one or more tactile probe sensors (40) having selective and interchangeably retrievable chuckable connection to the articulating head (8) of the coordinate-measuring machine.

11. A coordinate-measuring machine according to claim 7, characterized by the fact that the camera (9) is externally synchronized with the control system (22) of the coordinate-measuring machine.

12. The method of using a tactile coordinate-measuring machine for non-contact measurement of the coordinates of an object to be measured, wherein the machine is computer controlled and has a measuring arm which mounts a probe head having two orthogonally related axes of independent pivotal action, and wherein the probe head is rectilinearly displaceable over a workpiece table in each of three orthogonal axes (x, y, z), said method comprising the steps of:

(a) mounting a workpiece to the table;
(b) attaching a video camera to the probe head;
(c) using the camera to take and digitally store separate pictures of a point of object interest from each of two spaced positions wherein the camera is oriented to view different aspects of the point of object interest;
(d) measuring and digitally storing the x, y, and z coordinate data for the pictures taken and stored for said different aspects;
(e) measuring and digitally storing the angular-position data (a, b) about each of said pivotal axes for the pictures taken and stored for said different aspects;
(f) using photogrammetric methods to evaluate the stored pictures for picture coordinates of the point of object interest; and
(g) using the digitally stored data of steps (d) and (e), together with the picture coordinates evaluated in step (f), in a computer calculation of the positional coordinates of the point of object interest.

13. In a computer-operated coordinate-measuring machine having a base with means of workpiece support, and having a measurement arm measurably movable in the respective directions of three orthogonally related axes, said arm having an articulation probe head with provision for motor-driven rotary displacement and orientation-angle measurement of a tool-mounting means about each of two orthogonally related axes of rotation; the improvement in which:

(a) a video camera is mounted to the tool-mounting means of said head,
(b) a picture-storage device connected to said camera has the capacity to store a plurality of pictures of a machine-supported object to be measured, said computer being programmed to take a plurality of said pictures for each of a plurality of different aspects of viewing a single region of the object;
(c) picture-processing means connected to process stored picture data of one or more concordant picture points of said region and to calculate picture coordinates of said points; and
(d) an evaluation computer connected to the machine computer and responsive to the calculated picture coordinates of said points, as well as to the measured coordinate data of said arm and to the measured orientation-angle data of said head, for calculating object-point coordinates of the picture points by the method of space intersection.

14. A coordinate-measuring machine according to claim 13, wherein the means of object support is a turntable rotatable with respect to said base and having means for measuring instantaneous angular position of the turntable, said evaluation computer being additionally responsive to measured angular position of the turntable.

* * * * *